(12) United States Patent
Keh et al.

(10) Patent No.: US 11,868,018 B2
(45) Date of Patent: Jan. 9, 2024

(54) ELECTROCHROMIC ELEMENTS, DEVICES AND PRODUCTS, AND METHODS FOR MANUFACTURING AND UTILIZING THE SAME

(71) Applicant: The Hong Kong Research Institute of Textiles and Apparel Limited, Hong Kong (CN)

(72) Inventors: Edwin Yee Man Keh, Hong Kong (CN); Lei Yao, Hong Kong (CN); Yeung Yu Hui, Hong Kong (CN); Xinxin Huang, Hong Kong (CN); Yue Kit Hui, Hong Kong (CN); Colin Xin Chen, Hong Kong (CN); Derek Lai, Hong Kong (CN)

(73) Assignee: THE HONG KONG RESEARCH INSTITUTE OF TEXTILES AND APPAREL LIMITED, Hong Kong (CN)

( * ) Notice: Subject to any disclaimer, the term of this patent is extended or adjusted under 35 U.S.C. 154(b) by 36 days.

(21) Appl. No.: 15/733,737

(22) PCT Filed: Apr. 10, 2018

(86) PCT No.: PCT/CN2018/082579
§ 371 (c)(1),
(2) Date: Oct. 9, 2020

(87) PCT Pub. No.: WO2019/196020
PCT Pub. Date: Oct. 17, 2019

(65) Prior Publication Data
US 2021/0033940 A1  Feb. 4, 2021

(51) Int. Cl.
*G02F 1/157* (2006.01)
*G02F 1/1516* (2019.01)
(Continued)

(52) U.S. Cl.
CPC ............. *G02F 1/157* (2013.01); *D02G 3/441* (2013.01); *G02F 1/1523* (2013.01);
(Continued)

(58) Field of Classification Search
CPC .... G02F 1/157; G02F 1/15165; G02F 1/1523; G02F 1/1525; G02F 1/1533; G02F 1/163;
(Continued)

(56) References Cited

U.S. PATENT DOCUMENTS 5,446,577 A * 8/1995 Bennett .................... G02F 1/155
359/267
5,779,657 A * 7/1998 Daneshvar ........... A61B 17/135
602/60

(Continued)

FOREIGN PATENT DOCUMENTS

| CN | 101830090 A | 9/2010 |
| CN | 106773437 A | 5/2017 |
| TW | 200907129 A * | 2/2009 |

OTHER PUBLICATIONS

Wikipedia webpage "Electrochromic device" (Year: 2018).*
(Continued)

*Primary Examiner* — George G. King
(74) *Attorney, Agent, or Firm* — S&F/WEHRW (57) ABSTRACT

Disclosed are an electrochromic element, device, and product, and a manufacturing method therefor. The electrochromic device (7) comprises: an electrochromic yarn (6), an ion storage yarn (18), and a power source (8), wherein the electrochromic yarn (6) contains a first flexible conductive yarn (5) and an electrochromic layer (4) coated on a surface layer of the first flexible conductive yarn (5); the ion storage yarn (18) contains a second flexible conductive yarn (1) and an ion storage layer (17) coated on a surface layer of the second flexible conductive yarn (1); and the first flexible
(Continued)

conductive yarn (5) is electrically connected to a negative electrode of the power source (8), and the second flexible conductive yarn (1) is electrically connected to a positive electrode of the power source (8). The electrochromic device (7) can achieve a clear color development effect and make an electrochromic material have a good fastness. The preparation method is simple to operate and easily realizes industrial batch production.

7 Claims, 5 Drawing Sheets

(51) Int. Cl.
  *D02G 3/44* (2006.01)
  *G02F 1/1523* (2019.01)
  *G02F 1/163* (2006.01)
  *G02F 1/153* (2006.01)
  *G02F 1/155* (2006.01)
  *C25D 9/00* (2006.01)
  *C25D 9/06* (2006.01)
  *G02F 1/1524* (2019.01)
  *C25D 3/02* (2006.01)
  *C25D 7/06* (2006.01)
(52) U.S. Cl.
  CPC .......... *G02F 1/1525* (2013.01); *G02F 1/1533* (2013.01); *G02F 1/15165* (2019.01); *G02F 1/163* (2013.01); *C25D 3/02* (2013.01); *C25D 7/06* (2013.01); *C25D 9/00* (2013.01); *C25D 9/06* (2013.01); *D10B 2401/16* (2013.01); *D10B 2401/20* (2013.01); *D10B 2403/0114* (2013.01); *D10B 2403/02431* (2013.01); *G02F 1/155* (2013.01); *G02F 1/524* (2019.01)

(58) Field of Classification Search
  CPC ....... G02F 1/1524; G02F 1/155; D02G 3/441; C25D 3/02; C25D 7/06; C25D 9/00; C25D 9/06; D10B 2401/16; D10B 2401/20; D10B 2403/0114; D10B 2403/02431
  See application file for complete search history.

(56) References Cited

U.S. PATENT DOCUMENTS

| | | | |
|---|---|---|---|
| 6,072,619 A * | 6/2000 | Kiryuschev | D03D 15/547 359/252 |
| 10,273,600 B1 * | 4/2019 | Bharadwaj | G02F 1/13725 |
| 2004/0201878 A1 * | 10/2004 | Agrawal | G02F 1/155 359/266 |
| 2005/0137542 A1 * | 6/2005 | Underhill | A61F 13/42 604/361 |
| 2006/0281382 A1 * | 12/2006 | Karayianni | D03D 1/0088 442/306 |
| 2010/0163283 A1 * | 7/2010 | Hamedi | D03D 15/258 174/254 |
| 2010/0245971 A1 * | 9/2010 | Sotzing | D03D 15/54 359/265 |
| 2012/0224247 A1 * | 9/2012 | Sotzing | H01M 4/02 429/341 |
| 2018/0271180 A1 * | 9/2018 | Kim | A41D 1/002 |

OTHER PUBLICATIONS

International Search Report and Written Opinion of PCT application No. PCT/CN2018/082579 issued from the International Search Authority dated Feb. 12, 2019.

* cited by examiner

ELECTROCHROMIC ELEMENTS, DEVICES AND PRODUCTS, AND METHODS FOR MANUFACTURING AND UTILIZING THE SAME

CROSS-REFERENCE TO RELATED APPLICATIONS

This application is the National Stage of International Application No. PCT/CN2018/082579, filed Apr. 10, 2018, the disclosure of which is incorporated by reference herein in its entirety.

TECHNICAL FIELD

The present invention belongs to the technical field of textile electrochromism, and in particular, to an electrochromic device and a manufacturing and usage methods therefor.

BACKGROUND

In the 21st century, wearable devices have become an indispensable part of people's life. The success of the wearable devices has indirectly driven demands for smart clothing. With the advent of smart clothing that tracks signs of life, more organizations are starting to study more applications of smart clothing, among which the hottest is a smart clothing display. Therefore, in recent years, a large number of researches have focused on fibrous devices and materials and their application in fabric, and increasingly more products and scientific and technological achievements have been integrated into clothing, which makes the use of products more close to life and more convenient.

The current electrochromic textile process is becoming increasingly more mature, so it is no problem to make the fibrous devices flexible and electrochromic. However, in the existing technology, an electrochromic layer for the fibrous devices comprises mainly of a relatively thick organic polymer layer, and the electrochromic layer is not located on a surface layer of clothing/fabric. When applied to textiles, it may not only affect the appearance and comfort of smart textiles, but also restrict the shape of the textiles. On the other hand, existing preparation methods of an electrochromic layer applied to textiles are merely limited to sol-gel, ink-jet printing and transfer printing methods, which leads to complicated steps in the process of producing electrochromic textiles and is not conducive to mass production.

SUMMARY OF THE INVENTION

Unlike the existing technology, the present application uses a novel electrochromic yarn structure, for example, a combination of a conductive yarn coated with an inorganic electrochromic material (coating) and an ion storage yarn coated with an ion storage layer on a surface layer (as a counter electrode). In addition, unlike the electrochromic layer in the existing technology, the present application does not use current preparation methods and organic electrochromic material coatings commonly used in the art, but uses an electroplating process that has not been used in the technical field of textile electrochromism. The process directly electroplates an inorganic electrochromic material (for example, a metal oxide and/or an alloy oxide) onto a conductive yarn. Electroplating is a low-cost and rapid process in which an electrochromic material layer formed is thinner than the organic electrochromic material. Moreover, since the electrochromic material is directly coated on a surface layer of the conductive yarn by electroplating, a relatively clear color rendering effect can be achieved when it is applied to textiles. Meanwhile, the original flexible and morphological structure of the conductive yarn can be maintained, and the electrochromic layer obtained has good fastness.

In addition, unlike the electrochromic device in the existing technology, a color-changing layer/electrochromic (material) layer of the device disclosed in the present application can be located on an outer surface layer of a single yarn (an ion storage (material) layer of the device may also be located on the outer surface layer of the single yarn). The ion storage layer of the device may absorb and preserve hydrogen, lithium or sodium ions in a foreign environment, and release the absorbed ions to the electrochromic layer by changing voltage polarity, thus producing electrochromism. Therefore, single electrochromic and ion storage yarns may be inlaid into general fabric to weave different patterns. The electrochromic yarns and thus woven patterns change colors due to external ions at low voltage bias. The electrochromic device in the present application can operate under a low voltage, which is a comfortable and safe electrochromic device with low energy consumption.

The present application discloses a method for manufacturing an electrochromic element, a method for manufacturing an electrochromic device, and a product including an electrochromic element or device.

According to a first aspect of the present application, a method for manufacturing an electrochromic element is provided, including the following steps: providing a flexible conductive yarn, the flexible conductive yarn including a first flexible conductive yarn and a second flexible conductive yarn; and coating an electrochromic layer and an ion storage layer on the first flexible conductive yarn and the second flexible conductive yarn by an electroplating process respectively to prepare an electrochromic yarn and an ion storage yarn respectively, so as to obtain an electrochromic element including the electrochromic yarn and the ion storage yarn.

Preferably, the electroplating process includes the following steps: providing a mixture of a metallic powder, an oxidant and a dispersing solvent and making the mixture react to obtain an electroplating solution; immersing the first flexible conductive yarn and the second flexible conductive yarn in the electroplating solution for electroplating; taking out the first flexible conductive yarn and the second flexible conductive yarn, removing the excess electroplating solution, and optionally drying the first flexible conductive yarn and the second flexible conductive yarn; and annealing the first flexible conductive yarn and the second flexible conductive yarn.

Preferably, the method further includes adding a catalyst to the mixture.

Preferably, the metallic powder for preparing the electrochromic yarn or the ion storage yarn is selected from: titanium, vanadium, niobium, tantalum, chromium, molybdenum, tungsten, manganese, iron, cobalt, rhodium, osmium, hafnium, nickel or any combination thereof.

Preferably, a three-electrode electroplating system is adopted for the electroplating.

Preferably, the electroplating is carried out at room temperature for 1 to 15 minutes.

Preferably, the annealing time is 15 to 90 minutes, and the temperature is 60 to 100° C.

Preferably, the flexible conductive yarn includes a flexible conductive yarn made of metal.

Preferably, the flexible conductive yarn includes a flexible non-conductive organic polymer that is endowed with electrical conductivity by a conductive material.

Preferably, the flexible non-conductive organic polymer includes nylon, polyester, spandex, fiber or any combination thereof.

According to a second aspect of the present application, a method for manufacturing an electrochromic device is provided, the method including:

manufacturing an electrochromic element including an electrochromic yarn and an ion storage yarn with the method according to any implementation solution in the first aspect of the present invention; providing a power supply; and electrically connecting the power supply to the first flexible conductive yarn and the second flexible conductive yarn.

Preferably, an anode of the power supply is electrically connected to the second flexible conductive yarn, and a cathode of the power supply is electrically connected to the first flexible conductive yarn.

According to a third aspect of the present application, an electrochromic device is provided, including: an electrochromic yarn, an ion storage yarn and a power supply, the electrochromic yarn including a first flexible conductive yarn and an electrochromic layer coated on a surface layer of the first flexible conductive yarn, the ion storage yarn including a second flexible conductive yarn and an ion storage layer coated on a surface layer of the second flexible conductive yarn, the first flexible conductive yarn being electrically connected to a cathode of the power supply, and the second flexible conductive yarn being electrically connected to an anode of the power supply.

Preferably, the electrochromic yarn and the ion storage yarn are manufactured with the method according to any embodiment in the first aspect of the present invention.

Preferably, the electrochromic device operates at a low voltage.

Preferably, the low voltage is −0.8 V to +0.8 V.

Preferably, the first flexible conductive yarn and/or the second flexible conductive yarn are/is made of metal.

Preferably, the first flexible conductive yarn and/or the second flexible conductive yarn include(s) a flexible non-conductive organic polymer that is endowed with electrical conductivity by a conductive material.

Preferably, the flexible non-conductive organic polymer includes nylon, polyester, spandex, fiber or any combination thereof.

Preferably, the electrochromic layer includes an inorganic metal oxide or an alloy oxide or a combination thereof.

Preferably, the ion storage layer includes an inorganic metal oxide or an alloy oxide or a combination thereof.

Preferably, the electrochromic device produces electrochromism in an external environment with hydrogen, lithium, and/or sodium ions.

According to a fourth aspect of the present invention, a product including an electrochromic element manufactured with the method according to any implementation solution in the first aspect of the present invention or an electrochromic device manufactured with the method according to any implementation solution in the second aspect of the present invention or the electrochromic device according to any implementation solution in the third aspect of the present invention is provided.

Preferably, the product is a textile product.

Preferably, the electrochromic yarn and the ion storage yarn are inlaid in a fabric of the textile product to form a woven pattern.

Preferably, the electrochromic yarn is inlaid in an outer side of the fabric and the ion storage yarn is inlaid in an inner side of the fabric so that a color change of the electrochromic element is observable from the outside when the textile product is worn by a user.

Preferably, the product is an indicator for indicating the presence of hydrogen, lithium and/or sodium ions in an external environment.

According to a fifth aspect of the present application, a method using the product according to any implementation solution in the fourth aspect of the present application is provided, including the following steps: actively or passively bringing the product into contact with an external liquid environment containing hydrogen, lithium and/or sodium ions, an ion storage layer on the ion storage yarn absorbing hydrogen, lithium and/or sodium ions in the external liquid environment in the presence of a voltage; and changing polarity of the applied voltage so that the ion storage layer releases the absorbed ions to the electrochromic layer to produce electrochromism.

The device can achieve multiple cycles of color change and has special practicability, and the preparation method is easy to operate, easily implements industrial mass production and has a wide application potential in color-changing textiles and other color-changing fields.

BRIEF DESCRIPTION OF THE DRAWINGS

In order to describe the present invention more clearly, the present invention will be introduced in more detail below with reference to the accompanying drawings. Obviously, the accompanying drawings described below schematically illustrate only some embodiments of the present invention. Those of ordinary skill in the art may also obtain other implementation solutions according to the drawings without departing from the spirit of the present invention on the premise of making no creative efforts, in which.

DETAILED DESCRIPTION OF THE EMBODIMENTS

A more clear and complete exemplary description of the present invention will be given below with reference to embodiments.

Electrochromic Yarn and Ion Storage Yarn

Figure 1:
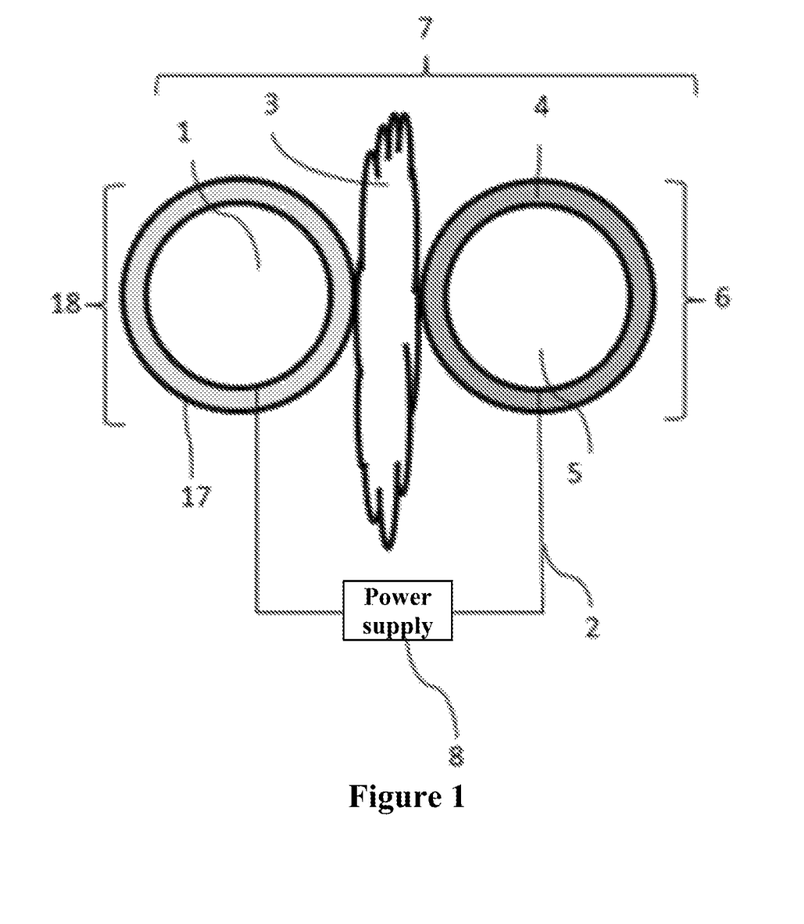
FIG. 1 is a schematic diagram of an electrochromic device according to an embodiment of the present application.

As shown in FIG. 1, an electrochromic device 7 includes an electrochromic yarn 6 and an ion storage yarn 18. The electrochromic yarn 6 and the ion storage yarn 18 may also be collectively referred to as an electrochromic element. The electrochromic yarn 6 includes a conductive yarn 5 and an electrochromic layer 4 (or referred to as an electrochromic material layer/coating) located (for example, coated/covered) on a surface layer/surface of the conductive yarn 5. The ion storage yarn 18 includes a conductive yarn 1 and an ion storage layer 17 (or referred to as an ion storage material layer/coating) located (for example, coated/covered) on a surface layer/surface of the conductive yarn 1.

The conductive yarns 1 and 5 are preferably flexible (referred to as flexible conductive yarns in this case), and can retain their original flexible and morphological structure after the electrochromic layer (or material) and the ion storage layer (or material) are coated to the surface layer/surface, for easy binding to ordinary fabric materials. The "binding" herein refers to an action of forming, by inlaying/weaving/knitting, the electrochromic yarn and the ion storage yarn into a part of fabric or making them enter into/on the fabric or taking them as a component of the fabric. The flexible conductive yarn may include or may be metal, for example, made of metal, or be a flexible non-conductive organic polymer that is endowed with electrical conductivity by a conductive material (for example, metal). The flexible non-conductive organic polymer may include nylon, polyester, spandex, fiber or any combination thereof.

Preferably, the flexible conductive yarns 1 and 5 used in the present invention are made of metal or are flexible yarns that are endowed with electrical conductivity by coating/impregnating a conductive material (for example, metal particles) with a conductive material. In a case where the flexible conductive yarns 1 and 5 are flexible conductive yarns that are endowed with electrical conductivity by coating/impregnating a conductive material with a non-conductive material, available yarn materials include a non-conductive organic polymer, such as nylon, polyester, spandex, fiber or any combination thereof. In this case, exemplary conductive metal particles in the flexible conductive yarns 1 and 5 include silver, copper, gold, iron, aluminum, zinc, nickel, tin and particles including at least one of the combinations of the metals. In a case where the flexible conductive yarns 1 and 5 are made of metal, iron and ferroalloys, such as stainless steel (alloys of carbon, iron and chromium) may be used, for example. In one embodiment, the conductive yarns 1 and 5 are silver-coated nylon yarns.

The resistivity of the conductive yarn may generally be about 300 Ω/m, but is not limited thereto. Those skilled in the art may select appropriate resistivity according to a specific application. There are no special restrictions on the length and width (cross-sectional diameter) of the conductive yarn except for practical considerations based on manufacturing considerations and intended use. A maximum cross-sectional diameter of the yarn may be 2 nanometers or larger, for example up to 2 centimeters. In an implementation solution, the maximum cross-sectional diameter of the yarn may be about 5 to 500 microns. For example, the width (diameter) of the conductive yarn may be chosen according to fibre/yarn/texture or other considerations of fabric into which the electrochromic yarn and the ion storage yarn are to be inlaid/woven.

Compared with the conductive yarn before being coated with the electrochromic layer or the ion storage layer, the electrochromic yarn and the ion storage yarn formed by the present invention have no significant change in diameter when observed by naked eyes. In addition, the electrochromic yarn and the ion storage yarn formed have little difference from ordinary fabric in hand feeling, which makes users feel more comfortable.

The electrochromic layer 4 and the ion storage layer 17 include a metal oxide or an alloy oxide or a combination thereof. Preferably, the electrochromic layer 4 and the ion storage layer 17 include an oxide and/or an alloy oxide of titanium, vanadium, niobium, tantalum, chromium, molybdenum, tungsten, manganese, iron, cobalt, rhodium, osmium, hafnium, nickel or any combination thereof. In an implementation solution, the electrochromic layer 4 includes a tungsten oxide ($WO_3$). In an implementation solution, the ion storage layer 17 also includes a tungsten oxide ($WO_3$). Materials of the electrochromic layer 4 and the ion storage layer 17 may be the same or different. Depending on polarity of a connected power electrode, the flexible conductive yarn in the present invention may be used as an electrochromic yarn or an ion storage yarn after being electroplated with a metal oxide. In a more specific implementation solution, after being electroplated with a metal oxide, the flexible conductive yarn in the present invention is an electrochromic yarn when connected to a cathode of the power supply and is an ion storage yarn when connected to an anode of the power supply.

Electrochromic Device

As shown in FIG. 1, the basic structure of the electrochromic device in the present invention includes an electrochromic yarn 6 and an ion storage yarn 18 as well as a power supply 8 electrically connected to the electrochromic yarn 6 and the ion storage yarn 18. Physically, an anode and a cathode of the power supply 8 are connected to the conductive material/structure of the conductive yarns 1 and 5.

Preferably, the electrochromic yarn 6 and the ion storage yarn 18 are arranged in parallel in applications (e.g., bound into/onto fabric). The electrochromic yarn 6 and the ion storage yarn 18 may be at a certain distance (for example, an environment 3 (or referred to as an external environment) may exist therebetween) or in contact with each other (for example, in a case where the electrochromic layer 4 and the ion storage layer 17 are thick enough to provide insulation). Any number of electrochromic yarn-ion storage yarn pairs may exist, depending on a desired woven pattern and display effect.

In the presence of external ions in the environment 3 (preferably, hydrogen, lithium and/or sodium ions), the ion storage layer 17 can absorb foreign ions in the environment 3 by providing a voltage for the conductive yarn 1 and 5. After this, by changing the polarity of the applied voltage, the ion storage layer 17 releases the absorbed ions to the electrochromic layer 3, so as to produce electrochromism.

Electroplating

As shown in FIG. 1, the electrochromic device 7 includes an electrochromic yarn 6, an ion storage yarn 18 and a power supply 8 electrically connected to the electrochromic yarn 6 and the ion storage yarn 18. Preferably, the electrochromic material layer 4 and the ion storage layer 17 are coated on outer surfaces of the conductive yarns 1 and 5 respectively by an electroplating process to form the electrochromic yarn 6 and the ion storage yarn 18. The electrochromic material layer 4 includes an inorganic electrochromic material/coating, and the ion storage layer 17 includes an inorganic ion storage material/coating.

Figure 2:
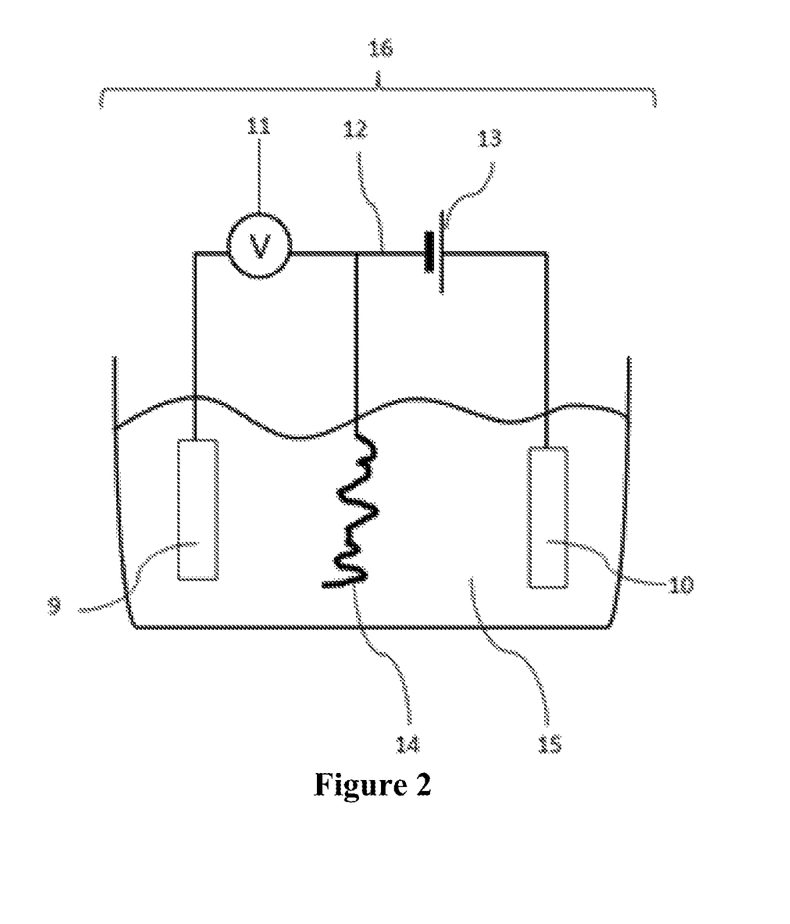
FIG. 2 is a schematic diagram of a three-electrode electroplating system used according to an embodiment of the present application.
Figure 3:
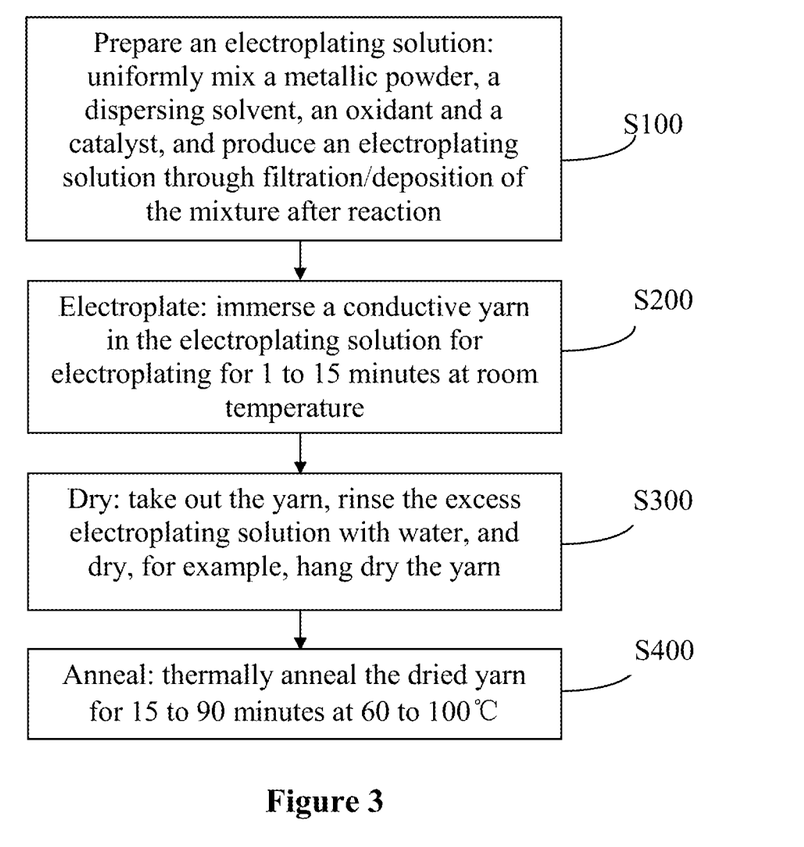
FIG. 3 is a schematic flowchart of electroplating according to an embodiment of the present application.

FIG. 2 is a schematic diagram of a three-electrode electroplating system 16 used in an implementation solution of the present application. FIG. 3 illustrates an electroplating process according to an implementation solution of the present application. The electroplating process in the present invention is described below with reference to FIG. 2 and FIG. 3.

The electrochromic layer and the ion storage layer are preferably electroplated by means of the three-electrode electroplating system 16 shown in FIG. 2. The three-electrode electroplating system 16 includes a counter electrode 9 and a reference electrode 10 and includes an electrochemical analyzer system 11 and a power supply source 13. The conductive yarn 14 is connected to the three-electrode system 16 as shown in the figure (connected to a negative output end 12 of the power supply source 13) and immersed in an electroplating solution 15 for electroplating.

An electroplating method is described below. As shown in FIG. 3, an exemplary method includes the following steps:
- preparing an electroplating solution: uniformly mixing a metallic powder, an oxidant (e.g., hydrogen peroxide), a dispersing solvent (e.g., 1:1 water and isopropyl alcohol) and preferably, a certain amount of catalyst (e.g., platinum powder), making the mixture react to obtain a solution including impurities and a metal/alloy oxide required by electroplating, and obtaining an electroplating solution after deposition/filtration of the impurities (S100);
- electroplating: immersing a conductive yarn in the electroplating solution for electroplating (e.g., by using a three-electrode electroplating system) for 1 to 15 minutes at room temperature (S200);
- drying: taking out the conductive yarn, rinsing the excess electroplating solution from the surface with water, and drying the conductive yarn, for example, hang dry (S300); and
- annealing: thermally annealing the dried conductive yarn for, e.g. annealing time being 15 to 90 minutes at a temperature of 60 to 100° C. (S400).

Through an electroplating process, the (inorganic) electrochromic layer 4 and the (inorganic) ion storage layer 17 in the present invention are coated on the flexible conductive yarns 5, 14 and 17 by electroplating. Organoleptically, the electrochromic yarn 6 electroplated with the electrochromic layer 4 and the ion storage layer 17 is not significantly different from the ion storage yarn 18 in color uniformity, and retains the flexibility and shapeability of a flexible yarn and also has good fastness (the electrochromic layer and the ion storage layer are not easy to peel off). In particular, the above implementation solution exemplarily describes the electroplating process of the electrochromic yarn 6, and the ion storage yarn 18 may be obtained by using the same electroplating process.

Product

The electrochromic device 7 in the present invention has special practicability, and especially may form all or a part of a product (particularly textiles and fabric), for example, an electrochromic yarn and an ion storage yarn may be inlaid into/onto fabric of textile products to form a woven pattern. For example, the electrochromic layer 4 in the electrochromic device 7 is located on an outer surface of the conductive yarn 5 (more preferably, the electrochromic yarn 6 may be inlaid on an outer side of the fabric, so that its color change can be observed, while the ion storage yarn 18 may be inlaid inside/on an inner side of the fabric, so that it is invisible from the outside). The ion storage layer 17 may store ions by absorbing foreign hydrogen ions, lithium ions and/or sodium ions in an environment 3 and release the absorbed ions to the electrochromic layer 4 by changing voltage polarity to change the color of the electrochromic layer 4.

As described above, preferably, the electrochromic yarn 6 and the ion storage yarn 18 are arranged in parallel in applications (e.g., bound into/onto the fabric). The electrochromic yarn 6 and the ion storage yarn 18 may be at a certain distance (for example, an environment 3 (or referred to as an external environment) may exist therebetween) or in contact with each other (for example, in a case where the electrochromic layer 4 and the ion storage layer 17 are thick enough to provide insulation). Any number of electrochromic yarn-ion storage yarn pairs may exist, depending on a desired woven pattern and display effect.

For example, the electrochromic element and device in the present invention can be inlaid/bound onto umbrella fabric and into jacket fabric, swimsuit fabric, lab coat fabric and so on to become corresponding products. Depending on a desired application, the electrochromic element and device can also be inlaid/bound into other products.

Usage Method

The product or device in the present invention is actively or passively brought into contact with an external liquid environment containing hydrogen, lithium and/or sodium ions (for example, raindrops (which may be acid rain and contain hydrogen ions) fall on umbrella fabric including the electrochromic element/device, a user sweats (including sodium ions) and wets a clothing fabric including the electrochromic element/device, and an unidentified liquid (possibly acid, containing hydrogen and other ions) is spilled onto lab coat fabric including the electrochromic element/device, or an article/product including the electrochromic element/device, for example, cloth, is actively brought into contact with an external liquid environment containing hydrogen, lithium and/or sodium ions). When a voltage is applied to the first flexible conductive yarn and the second flexible conductive yarn, the ion storage layer on the ion storage yarn absorbs the hydrogen, lithium and/or sodium ions in the external liquid environment, and then polarity of the applied voltage is changed so that the ion storage layer releases the absorbed ions to the electrochromic layer to produce electrochromism.

The use of the product may be considered as an indicator/alarm to prove/indicate the presence of target ions.

The present invention is further described below through embodiments.

Embodiment 1

This embodiment provides an exemplary electroplating process of an electrochromic yarn 6, including the following steps:
1. Prepare an electroplating solution: a tungsten powder (1.8 g, Alfa Aeser, USA) is mixed with an $H_2O_2$ (oxidant) solution (30%, 60 mL, Tokyo Chemical Industry, Japan), water and molybdenum (catalyst), and the mixture is stirred continuously for 12 hours. The solution turns pale yellow after stirring and reacting. After filtration of sediments, a clear solution (electroplating solution 15) from which $WO_3$ solids are removed is obtained.
2. Electroplate: a three-electrode electroplating system 16 is used, which takes Pt and Ag/AgCl as a counter electrode 9 and a reference electrode 10 and includes an electrochemical analyzer system 11 and a power supply source 13. A conductive yarn 14 is connected to the three-electrode system 16, and is impregnated in the electroplating solution 15 prepared as above. The conductive yarn is electroplated at 0.5 V by using the electrochemical analyzer system 11, and is deposited for 200 s.
3. Dry: the yarn 14 is taken out from the electroplating solution 15, the excess electroplating solution remaining on the yarn 14 is rinsed with deionized water, and the yarn hangs up to dry.
4. Anneal: the dried yarn 14 is thermally annealed at 80° C., the annealing time is 45 minutes.

The ion storage yarn 18 can be obtained through a similar electroplating process, and the obtained ion storage yarn 18 and electrochromic yarn 6 are connected to a power supply, so as to obtain an electrochromic device 7.

The electrochromic device 7 obtained in this embodiment can be preserved and change color by absorbing foreign hydrogen, lithium and/or sodium ions. The electrochromic device 7 exhibits an electrochromic effect in a liquid environment with $H^+$ $Na^+$. In one embodiment, the electrochromic device 7 in the present application exhibits an electrochromic effect by contacting a sulfuric acid solution (0.1 M). In another embodiment, the electrochromic device 7 in the present application exhibits an electrochromic effect by contacting sulfuric acid gel (0.1 M).

Figure 4:
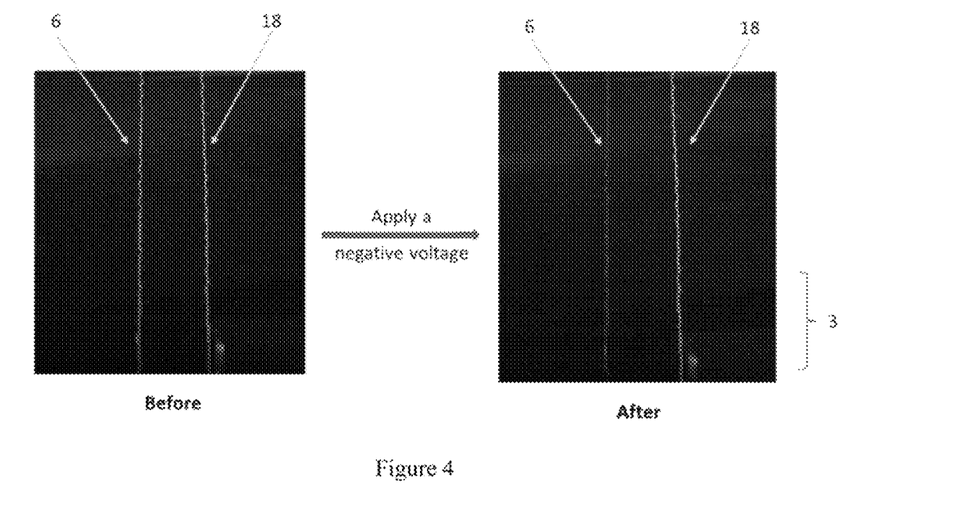
FIG. 4 are photographs showing change results before (left panel) and after (right panel) a change in voltage polarity according, to an implementation solution of the present application.
Figure 5:
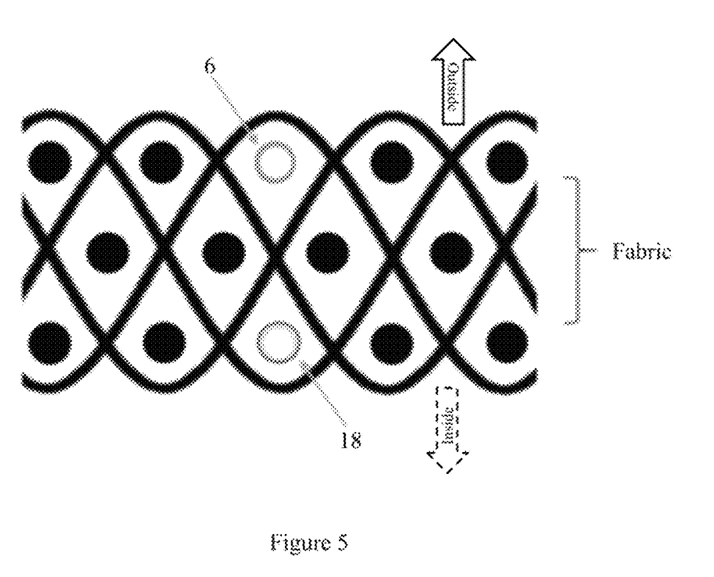
FIG. 5 is a schematic diagram showing from an isometric view a fabric of a textile product including the electrochromic yarn (6) inlaid in an outer side of the fabric and the ion storage yarn (18) inlaid in an inner side of the fabric of the present disclosure according to certain embodiments arranged in parallel with each other at a distance along a warp direction to form an electrochromic yarn-ion storage yarn pair, wherein the electrochromic yarn and the ion storage yarn are inlaid in two different sides of a fabric of the textile product to form a woven pattern.

An operating voltage of the electrochromic device 7 in this embodiment is −0.8 V to +0.8 V. In this embodiment, in a case where a negative voltage is applied, the electrochromic layer 4 absorbs ions in the environment and is approximately black. Conversely, by changing the polarity, the electrochromic layer 4 can release the absorbed ions at a positive voltage and become approximately transparent. FIG. 4 shows the appearance of the electrochromic layer before (left panel) and after (right panel) the negative voltage is applied, where the electrochromic yarn 6 turns into approximately black after the negative voltage is applied (the yarn on the left in the right panel becomes more fainted after negative voltage is applied, as compared to the ion storage yarn 18 on the right). The electrochromic process may be repeated Embodiments of the present invention are described above with reference to the accompanying drawings, but the present invention is not limited to the specific implementation solutions described above. The above specific implementation solutions are merely schematic and not restrictive. Under the inspiration of the present invention, those of ordinary skill in the art can also make many other forms without departing from the purpose of the present invention and the scope for which protection is sought by claims, all of which are within the protection of the present invention. In addition, it should be understood that, after reading the contents of the present invention, those skilled in the art can make various alterations or modifications to the present invention, and these equivalent forms also fall within the scope defined by the claims attached to the present application.

What is claimed is:

1. A textile product comprising an electrochromic device, the electrochromic device comprising an electrochromic yarn, an ion storage yarn and a power supply, the electrochromic yarn comprising a first flexible conductive yarn and an electrochromic layer coated on a surface layer of the first flexible conductive yarn, the ion storage yarn comprising a second flexible conductive yarn and an ion storage layer coated on a surface layer of the second flexible conductive yarn, the first flexible conductive yarn being electrically connected to a cathode of the power supply, the second flexible conductive yarn being electrically connected to an anode of the power supply, the electrochromic yarn and ion storage yarn being arranged in parallel with each other at a distance along a warp direction to form an electrochromic yarn-ion storage yarn pair, and wherein ions may be transferred between the electrochromic layer and the ion storage layer upon an application of a polarity-switchable voltage from the power supply to the electrochromic yarn and ion storage yarn through an external environment if said external environment is filled with a material capable of conducting ions, the electrochromic layer and the ion storage layer being selected from an inorganic metal oxide or an alloy oxide or a combination thereof, wherein the electrochromic yarn and the ion storage yarn are inlaid in two different sides of a fabric of the textile product to form a woven pattern.

2. The textile product according to claim 1, wherein the polarity-switchable voltage from the power supply applied to the electrochromic device ranges from −0.8 V to +0.8 V.

3. The textile product according to claim 1, wherein the first flexible conductive yarn and/or the second flexible conductive yarn are/is made of metal, or comprise(s) a flexible non-conductive organic polymer that is endowed with electrical conductivity by a conductive material.

4. The textile product according to claim 1, wherein the electrochromic device is capable of producing electrochromism when the external environment includes hydrogen, lithium, and/or sodium ions.

5. The textile product according to claim 1, wherein the electrochromic yarn is inlaid in an outer side of the fabric and the ion storage yarn is inlaid in an inner side of the fabric so that a color change of the electrochromic element is observable from the outside when the textile product is worn by a user.

6. The textile product according to claim 1, wherein the textile product is capable of indicating the presence of hydrogen, lithium and/or sodium ions in the external environment in the presence of the polarity-switchable voltage from the power supply.

7. A method indicating a presence of hydrogen, lithium and/or sodium ions in an external environment, the method comprising the following steps:
   actively or passively bringing the textile product of claim 1 into contact with an external liquid containing hydrogen, lithium and/or sodium ions, the ion storage layer on the ion storage yarn absorbing the hydrogen, lithium and/or sodium ions in the external liquid, wherein the external liquid is said material capable of conducting the hydrogen, lithium, and/or sodium ions; and
   switching the polarity of the voltage applied to the ion storage yarn with that applied to the electrochromic yarn in order to release the absorbed hydrogen, lithium and/or sodium ions from the ion storage layer to the electrochromic layer, thereby changing colors of the electrochromic yarn and the woven pattern.

* * * * *